(12) United States Patent  
Di Zazzo et al.

(10) Patent No.: US 9,981,738 B2  
(45) Date of Patent: May 29, 2018

(54) PARKING BRAKE CONTROL SYSTEM FOR AN AIRCRAFT

(71) Applicant: Bombardier Inc., Dorval (CA)

(72) Inventors: Marco Di Zazzo, St-Leonard (CA); Bertrand Plante, St-Jérôme (CA)

(73) Assignee: BOMBARDIER INC., Dorval (CA)

( * ) Notice: Subject to any disclaimer, the term of this patent is extended or adjusted under 35 U.S.C. 154(b) by 0 days. days.

(21) Appl. No.: 14/770,653

(22) PCT Filed: Feb. 25, 2014

(86) PCT No.: PCT/IB2014/000200  
§ 371 (c)(1),  
(2) Date: Aug. 26, 2015

(87) PCT Pub. No.: WO2014/135940  
PCT Pub. Date: Sep. 12, 2014

(65) Prior Publication Data  
US 2016/0009384 A1     Jan. 14, 2016

Related U.S. Application Data

(60) Provisional application No. 61/773,463, filed on Mar. 6, 2013.

(51) Int. Cl.  
*B64F 1/22*     (2006.01)  
*B64C 25/42*     (2006.01)  
(Continued)

(52) U.S. Cl.  
CPC .............. *B64C 25/42* (2013.01); *B60T 7/085* (2013.01); *B60T 17/22* (2013.01); *B64D 47/02* (2013.01); *B64F 1/22* (2013.01); *Y02T 50/826* (2013.01)

(58) Field of Classification Search  
CPC .... B60T 7/16; B60T 7/20; B60T 17/22; B64F 1/225; B64F 1/228; B64C 25/42; B64D 47/02  
See application file for complete search history.

(56) References Cited

U.S. PATENT DOCUMENTS 3,937,290 A * 2/1976 Benning .............. B62D 51/005  
                                                       180/14.7  
3,977,631 A    8/1976 Jenny  
(Continued)

FOREIGN PATENT DOCUMENTS

CN          101117155     2/2008  
EP          0275787 A1    7/1988  
(Continued)

OTHER PUBLICATIONS

State Intellectual Property Office of the People's Republic of China; Office Action dated Sep. 28, 2016.  
(Continued)

*Primary Examiner* — Bradley T King  
(74) *Attorney, Agent, or Firm* — Norton Rose Fulbright Canada LLP

(57) ABSTRACT

A system for providing control to a parking brake for an aircraft (10) having a power source includes a panel (28) accessible from an exterior of the aircraft (10) and a parking brake switch (32) disposed on the panel (28) providing control over the engagement and disengagement of the parking brake on the aircraft (10), a method operating such a system for providing control to a parking brake is also disclosed.

27 Claims, 6 Drawing Sheets

(51) Int. Cl.
*B60T 7/08* (2006.01)
*B60T 17/22* (2006.01)
*B64D 47/02* (2006.01)

(56) References Cited

U.S. PATENT DOCUMENTS

| | | | |
|---|---|---|---|
| 4,976,499 A | 12/1990 | Guichard | |
| 6,305,484 B1 * | 10/2001 | Leblanc | B60T 7/16 |
| | | | 180/167 |
| 7,857,107 B2 | 12/2010 | Yamamoto et al. | |
| 8,924,040 B2 | 12/2014 | Edelson et al. | |
| 9,056,686 B2 * | 6/2015 | Chan | B64F 1/10 |
| 2005/0269873 A1 | 12/2005 | DeVlieg | |
| 2006/0065779 A1 * | 3/2006 | McCoskey | B64F 1/32 |
| | | | 244/100 R |
| 2008/0099603 A1 | 5/2008 | Yamamoto | |
| 2008/0133072 A1 * | 6/2008 | Yamamoto | B60T 17/221 |
| | | | 701/9 |
| 2009/0014261 A1 | 1/2009 | Edelson et al. | |
| 2011/0127366 A1 | 6/2011 | Becker | |
| 2014/0210647 A1 * | 7/2014 | Ataman | G08B 21/187 |
| | | | 340/960 |

FOREIGN PATENT DOCUMENTS

| | | |
|---|---|---|
| EP | 1886887 A1 | 2/2008 |
| WO | 2010012261 A2 | 2/2010 |

OTHER PUBLICATIONS

Chinese Patent Office; Office Action dated Apr. 1, 2016 re: Chinese Patent Application No. 201480011802.0.
English abstract of CN101117155(A) from http://worldwide.espacenet.com.
PCT International Search Report and Written Opinion dated Jun. 5, 2014 re: International Patent Application No. PCT/IB2014/000200.
The State Intellectual Property Office of the People's Republic of China; Office Action dated May 16, 2017 re: application No. 201480011802.0.

* cited by examiner ic brakes. The present invention also addresses activation of navigation lights, beacon lights, and control over the steering system for the aircraft.
PARKING BRAKE CONTROL SYSTEM FOR AN AIRCRAFT

CROSS REFERENCE TO RELATED APPLICATION AND CLAIM OF PRIORITY

This application is a national phase application under 35 U.S.C. 371 of International Patent Application No. PCT/IB2014/000200 filed on Feb. 25, 2014, which claims priority from U.S. provisional patent application Ser. No. 61/773,463 filed on Mar. 6, 2013, the entire contents of which are hereby incorporated by reference.

FIELD OF THE INVENTION

The present invention concerns the construction and operation of a brake system for an aircraft. More specifically, the present invention involves the construction and operation of a parking brake control system for an aircraft having electric brakes. The present invention also addresses activation of navigation lights, beacon lights, and control over the steering system for the aircraft.

DESCRIPTION OF THE RELATED ART

There are many reasons why an aircraft might need to be towed after parking at (for example) a gate at an airport. It may be necessary to move the aircraft to another gate. Still further, the aircraft may need to be towed to and from a hangar in connection with maintenance activities.

Conventionally, when towing an aircraft, it is standard practice for the operation to involve at least two persons: (1) a first person on board the aircraft, responsible for monitoring operational characteristics of the aircraft from the cockpit, and (2) a person operating the towing vehicle. The two persons typically communicate with one another via headsets that are connected to the communications system on board the aircraft. The person on board the aircraft may be a pilot or co-pilot or a trained aircraft technician.

The expense associated with towing an aircraft includes the expense(s) associated with the personnel required for such activity. In addition, the aircraft has to be powered up, meaning that one or more of the engines (or auxiliary power units) need to be running for the aircraft to be towed. It is only while at least one engine is running that it becomes possible for the brakes and steering to be made operational, because the brakes and the steering in a traditional aircraft are hydraulic. Hydraulic brakes require a source of pressurized hydraulic fluid. As a result, traditional aircraft must be powered up so that the hydraulic pumps are operational. Obviously, when the aircraft is powered up and at least one of the engines (or auxiliary power units) is running, the aircraft is burning fuel, which adds to the cost of moving the aircraft from one location to another.

Some modern aircraft incorporate electrical brakes therein, which operate differently from hydraulic brakes.

In view of the foregoing, a need has developed for a more cost effective system permitting the towing of an aircraft.

SUMMARY OF THE INVENTION

The present invention addresses one or more of the deficiencies noted with respect to the prior art.

The present invention provides a system for providing control to a parking brake for an aircraft having a power source that includes a panel accessible from an exterior of the aircraft and a parking brake switch disposed on the panel providing control over the engagement and disengagement of the parking brake on the aircraft. The panel may be proximate to a landing gear on the aircraft or proximate to the nose of the aircraft.

It is contemplated that the parking brake is an electric brake.

The parking brake system also may include a power switch disposed on the panel to provide power to the system from the power source.

It is contemplated that the power source is at least one battery on the aircraft.

The parking brake system of the present may include a navigation lights switch. The navigation lights switch permits activation and deactivation of navigation lights on the aircraft when power is provided to the electric brakes. The navigation lights may be powered by the power source.

It is contemplated that beacon lights on the aircraft may be activated when the navigation lights are activated. The beacon lights are powered by the power source.

In addition, it is contemplated that the parking brake system also may include a tow/no tow status indicator. Towing is permitted when the tow/no tow status indicator indicates that towing is permitted, the steering is free to rotate and the parking brake is disengaged. Towing is not permitted when the tow/no tow status indicator indicates that towing is not permitted and the parking brake or steering is engaged.

With respect to the parking brake system of the present invention, the panel is accessible by a person standing on the ground, adjacent to the aircraft.

The present invention also provides a method of operating a system for providing control to a parking brake for an aircraft having a power source, a panel accessible from an exterior of the aircraft and a parking brake switch disposed on the panel to provide control over the engagement and disengagement of the parking brake on the aircraft. The method includes determining if towing is permitted for the aircraft, after activation of the power switch, providing power from the power source to the parking brake, and, if towing is not permitted, receiving a signal from the parking brake switch to disengage the parking brake.

Further aspects of the present invention will be made apparent form the paragraphs that follow.

BRIEF DESCRIPTION OF THE DRAWING(S)

The present invention will now be described in connection with the drawing appended hereto, in which.

DETAILED DESCRIPTION OF EMBODIMENT(S) OF THE INVENTION

The present invention will now be described in connection with one or more embodiments thereof. The discussion of any particular embodiment is not intended to be limiting of the present invention. To the contrary, the discussion of selected embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the content of the construction of an aircraft 10, such as the one illustrated in the perspective view provided in FIG. 1.

Figure 1:
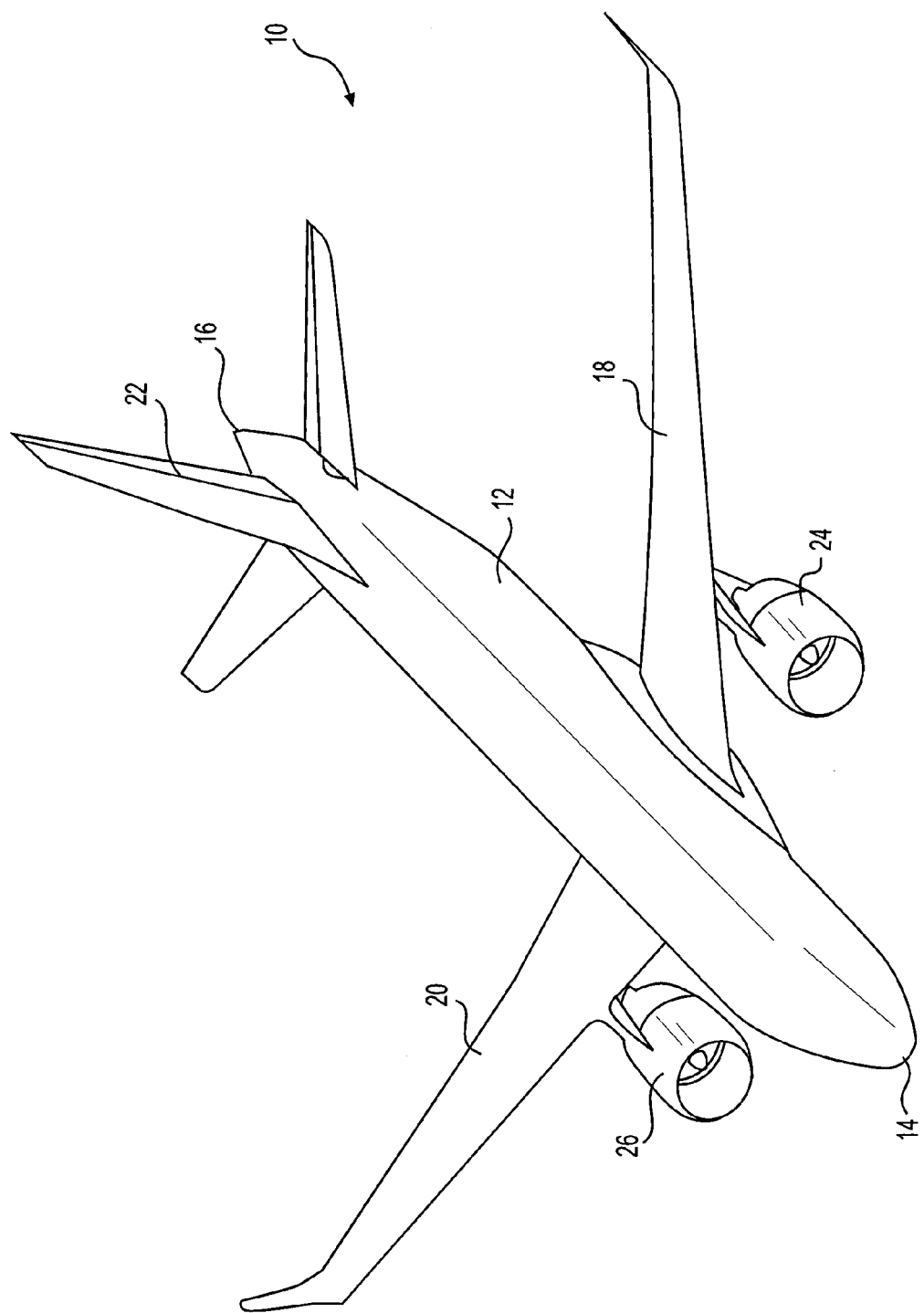
FIG. 1 is a perspective illustration of an aircraft that incorporates the features of the present invention.

FIG. 1 is a perspective illustration of an aircraft 10 to which the present invention applies. The aircraft 10 includes a fuselage 12 defining a forward end 14 and a rear (or aft) end 16. Two wings 18, 20 extend laterally from the fuselage 12. A tail section 22 is attached to the rear end 16 of the aircraft. As should be apparent to those skilled in the art, the wings 18, 20 and the tail section 22 incorporate multiple control surfaces that are responsible for flying characteristics and flight operations of the aircraft 10. Two engines 24, 26 are suspended from and connect to the wings 18, 20, as illustrated. In an alternative, the engines 24, 26 could be attached to other regions of the aircraft 10, such as to the aircraft fuselage to towards the rear end 16 of the aircraft 10.

As discussed above, when towing a conventional aircraft 10 that relies upon hydraulics to power the brakes and steering, the aircraft 10 must be powered up. This means that at least one of the engines 24, 26, or auxiliary power unit (not shown), must be operating so that the aircraft 10 is generating power. More specifically, this means that the aircraft 10 must be operating under internal power so that the hydraulic pumps are operating. The hydraulic pumps are needed to generate pressurized hydraulic fluid to operate the brakes and steering, among other systems on the aircraft 10.

When the aircraft 10 is powered up, a person is required to be on board the aircraft 10 in order to monitor the systems while they are active on the aircraft 10. In addition, the person on board the aircraft 10 will be in communication with the person on the ground via headsets and microphones so that the persons may coordinate activities during the towing of the aircraft 10 from one location to another. The person is present in case of an emergency that would require application of the brakes.

The present invention concerns the construction of an aircraft 10 that includes electric brakes. As should be apparent to those skilled in the art, electric brakes differ from hydraulic brakes. Rather than relying on hydraulic fluid to operate the calibers in the brakes on the wheels, the brakes on the aircraft 10 of the present invention includes electric motors (i.e., servomotors) that press the brake pads against the disks on the wheels of the aircraft 10.

It is noted that the present invention contemplates that the steering for the aircraft also will be electrically controlled. In other words, the steering for the aircraft 10 of the present invention is contemplated to be powered via hydraulic fluid, where the hydraulic operation is controlled via a steer by wire system. As a variant, the steering of the aircraft 10 may be done by servomotors and/or electromechanical actuators, where the servomotors and/or electromechanical actuators are controlled via the steer by wire system.

By incorporating steer by wire system into the aircraft, it is possible for the steering to be disengaged easily. When the steering system is disabled, a hydraulic valve in the steering valve bypasses the hydraulic port to the return post. As a result, with this steering system, it is not necessary for the aircraft 10 to be powered for the steering to be disengaged.

In fact, the aircraft 10 of the present invention contemplates that the steering will be disabled when the aircraft 10 is powered down.

By incorporating electric brakes into the design of the aircraft 10, it becomes possible to energize and/or de-energize the brakes on the aircraft 10 without having to power up the aircraft 10. Specifically, by relying on electric brakes, it becomes possible to control the brakes using battery power on board the aircraft 10. In other words, it becomes possible to energize/de-energize the brakes without having to power up the aircraft and start any of the systems on board. As a result, the aircraft 10 need not expend any fuel if it is necessary to tow the aircraft 10 to a secondary location. This construction results in lower costs associated with the towing of the aircraft 10 and greatly facilitates towing of the aircraft 10.

A further advantage of electric brakes lies in the fact that a person need not be on board the aircraft 10 to monitor any systems, because the aircraft's systems remain unpowered during the towing operation. As a result, it is not necessary to have a person on board the aircraft 10 during the towing operation. This further reduces the cost associated with the towing of the aircraft 10.

It is noted that the present invention is intended to be used in what is known as "towbarless" towing. Towbarless towing involves using equipment to lift the nose of the aircraft 10. Towbar towing involves attaching a towbar to the front landing gear and pushing or pulling the aircraft 10 via the towbar. The front wheels remain on the ground. As should be apparent to those skilled in the art, during towbarless towing, the front landing gear is lifted from the ground.

While the present invention contemplates use in connection with towbarless towing, the present invention is not limited solely thereto. It is possible that the parking brake system of the present invention may be used in connection with towbar towing as well.

Figure 2:
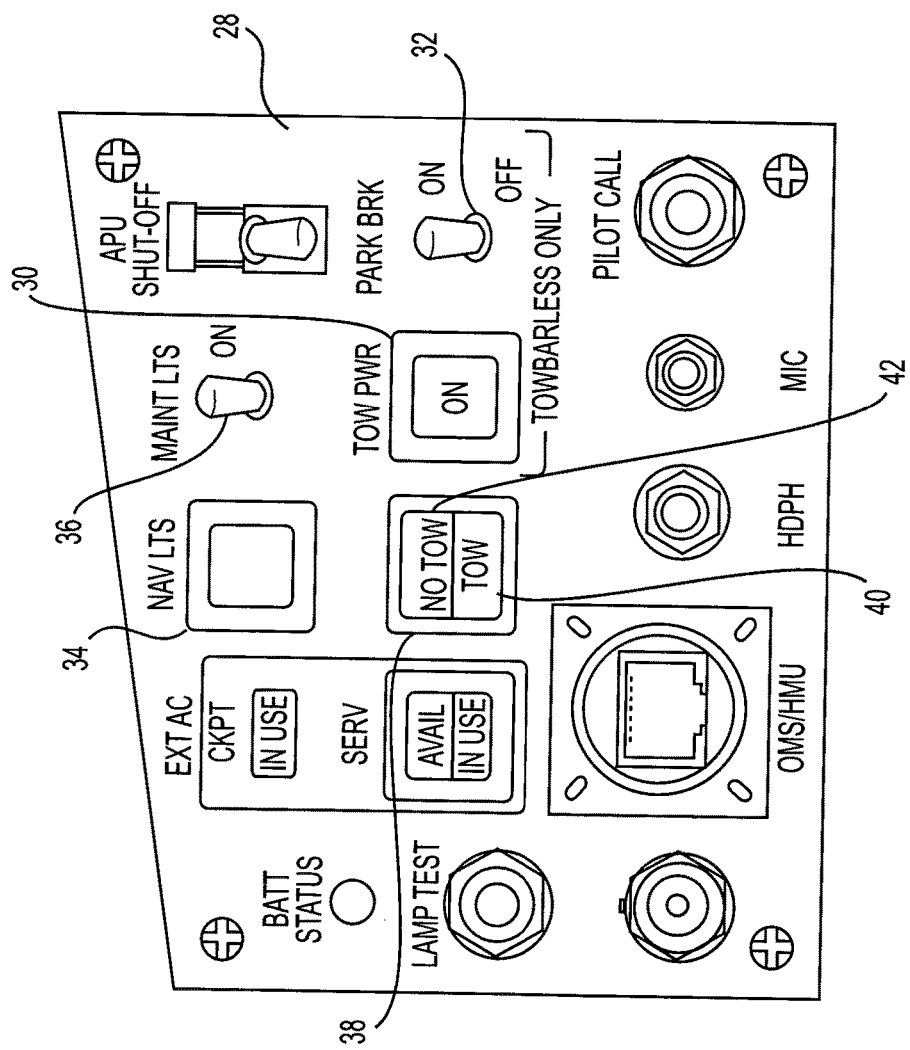
FIG. 2 is a graphical representation of a control panel made available to persons external to an aircraft to permit control over aspects of the aircraft when towing the aircraft.

FIG. 2 is a graphical representation of a control panel 28 of the type that may be made available to ground crew personnel seeking to tow an aircraft 10 from a point of origin to a destination location. The panel 28 is contemplated to be located at a convenient position near to the front end 14 of the aircraft 10. This permits the ground technician to access the brakes of the aircraft 10 from a location external to the aircraft 10.

With respect to the present invention, the panel 28 includes several features that are pertinent to the present invention. Those features are discussed in connection with their respective operation in the paragraphs that follow.

The panel 28 includes a tow power switch and indicator 30, a parking brake switch 32, and a tow status indicator 38. The parking brake switch 32 permits the ground personnel to activate or deactivate the parking brake (also referred to as the electric brakes) for the aircraft 10. If the parking brake switch 32 is in the "on" position, indicating that the parking brake is engaged, the aircraft 10 is not in a condition to be moved. If the parking brake switch is in the "off" position, the parking brakes are disengaged and aircraft 10 may be towed if used in conjunction with the tow power switch 30.

With respect to the parking brake, it is understood that one or more of the wheels on the aircraft 10 may be locked by operation of the parking brake. The parking brake switch 32, therefore, is intended to engage or release the parking brakes on all of the wheels at the same time. In an alternative embodiment, it is contemplated that separate parking brake switches may be dedicated to individual ones of the parking brake on the aircraft 10 without departing from the scope of the present invention.

With respect to conventional wisdom, if the aircraft 10 is powered (meaning that someone is on board and the aircraft's active power systems are turned on), the parking brake system 48 of the present invention may be disabled so that it is not available to the ground crew. If the aircraft 10 is powered, power for the electric brakes will be provided by the aircraft's main power systems. As an aside, it is noted that, when the aircraft 10 is powered, the park brake switch 32 is deactivated.

When the aircraft 10 is powered, the parking brake system 48 of the present invention is disabled so that the flight crew may maintain control over the positioning and movement of the aircraft. When the aircraft 10 is powered and the crew is on board, it is considered prudent for ground personnel to coordinate activities with the flight crew. Specifically, if the parking brake system 48 is available when the aircraft 10 is powered up, it is possible that the flight crew might request one action but that the ground crew might initiate a second action. For the safety of all involved, it is better practice to avoid such a potential conflict. As a result, the parking brake system 48 of the present invention is contemplated to be available to the ground crew only when the aircraft 10 is powered down.

If the aircraft 10 is not powered by its internal power systems and a ground technician presses the tow power switch 30, the tow bar power indicator 30 will light up to indicate that tow bar power is active and that power is being provided to the brakes for their operation. As discussed in greater detail below, power for towing is provided by one or more batteries on board the aircraft 10.

The panel 28 also includes a navigation lights switch and indicator 34 to indicate when the navigation lights are activated. The navigation lights include, but are not limited to, the lights on the aircraft 10 that include the red and green lights designating the port and starboard sides of the aircraft 10. It is customary, if not required, for the navigation lights on an aircraft 10 to be turned on any time that the aircraft 10 is moving on the ground. This includes instances when the aircraft 10 is being towed. It is contemplated that, after the power switch 30 is turned to the "on" position, the navigation lights will be made available so that they may be activated via the navigation lights power switch 34. It is contemplated separately that the navigation lights may be available even if the tow power switch 30 has not been turned to the "on" position. In one embodiment, the navigation lights will be turned on when the park brake switch is turned to the "off" position, permitting towing.

Separately, it is contemplated that the beacon lights on the aircraft 10 may be activated together with the navigation lights. The beacon lights include the strobe lights that are positioned at various locations on the aircraft 10. It should be understood that the beacon lights may not require to be activated when the aircraft 10 is being towed. However, those skilled in the art may appreciate that it may be preferred for the beacon lights to be activated together with the navigation lights. As such, while it is contemplated that the navigation lights will be turned on after the parking brake system 48 is activated, the beacon lights may or may not be activated, as required or as desired. The beacon lights may be provided with a separate activation switch without departing from the scope of the present invention.

The panel 28 also includes a maintenance lights switch 36 that permits power to be provided to the maintenance lights on the aircraft 10. As should be apparent to those skilled in the art, the maintenance lights need not be activated when the aircraft 10 is being towed.

The panel 28 includes a tow/no tow indicator 38, which includes two indicators: (1) a tow light 40 (green), and (2) a no tow light 42 (red). When the ground technician accesses the panel 28, the tow/no tow indicator 38 will provide an indication if the aircraft 10 may be towed or not, depending upon which light 40, 42 is illuminated. The tow/no tow indicator 38 indicates if the parking brake is engaged or not.

Figure 3:
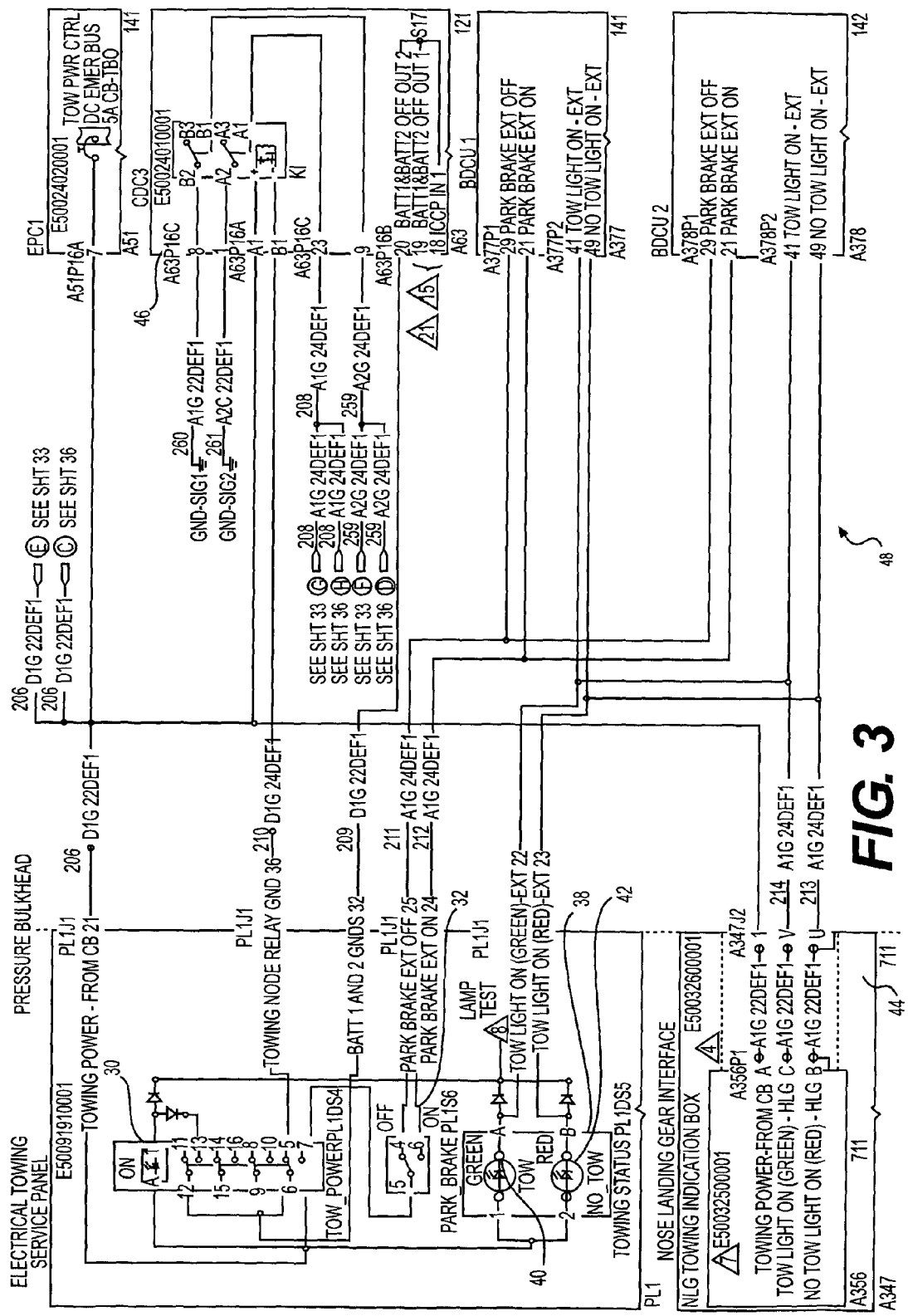
FIG. 3 is a first circuit diagram outlining selected aspects of the parking brake system of the present invention.

FIG. 3 is an electrical circuit diagram that provides some details concerning the construction of the parking brake system 48 of the present invention.

In FIG. 3, the parking brake switch 32 and power switch and indicator 30 are designated. In addition, the tow/no tow indicator 38 is designated as are the lights 40, 42. In addition, a nose landing gear towing indicator box 44 (otherwise designated as the tow indicator box 44) is designated. The tow indicator box 44 also includes red and green lights to provide an indication of the towing status of the aircraft 10. The tow indicator box 10 is contemplated to be located at the nose 14 of the aircraft, in a position where its indicator lights are readily visible to the ground crew.

FIG. 3 also includes an indication of a power source 46 for the parking brake system 48 of the present invention.

Figure 4:
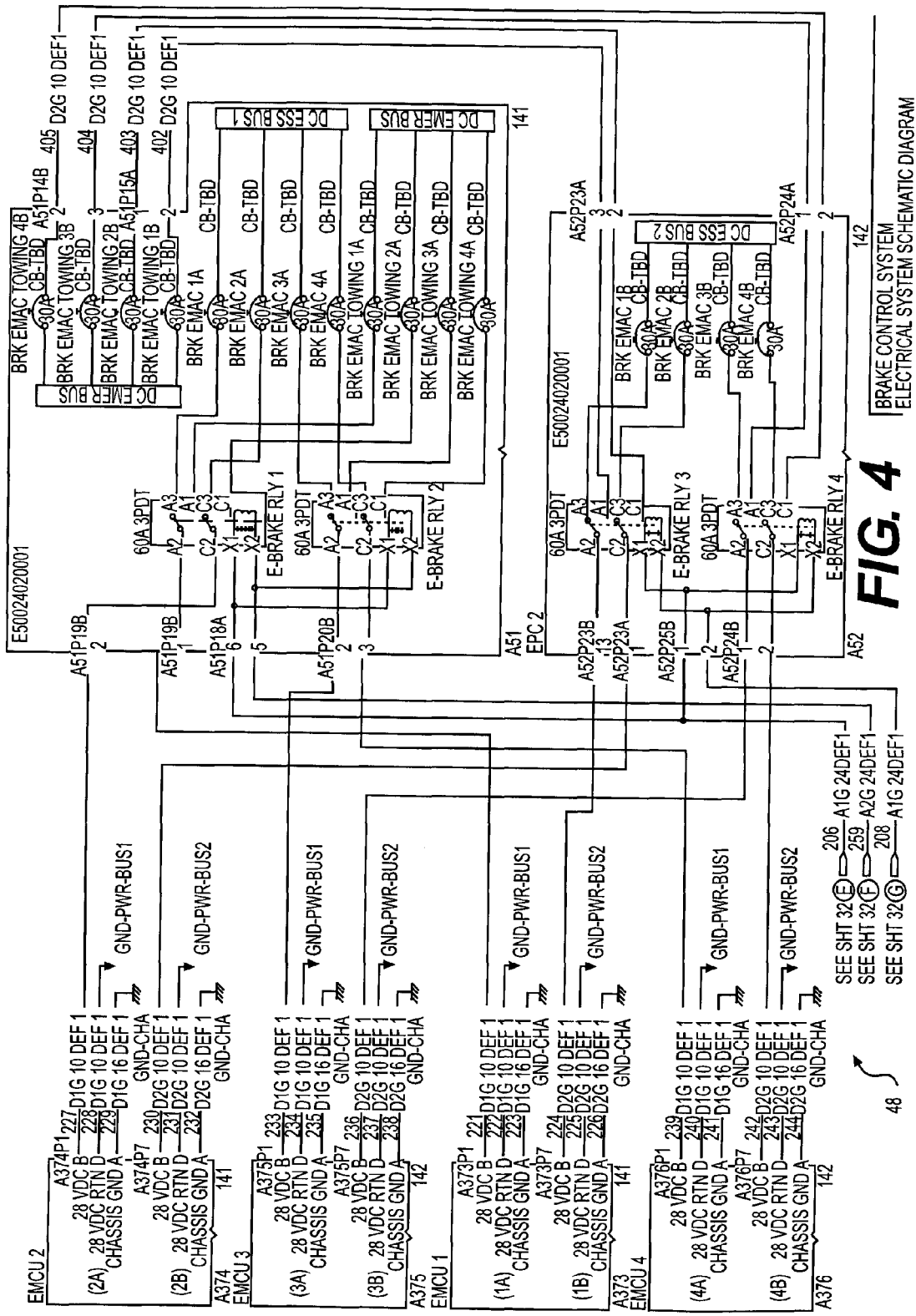
FIG. 4 is a second circuit diagram outlining further aspects of the system of the present invention.

FIG. 4 is an electrical circuit diagram that provides additional details concerning the parking brake system 48 of the present invention.

Figure 5:
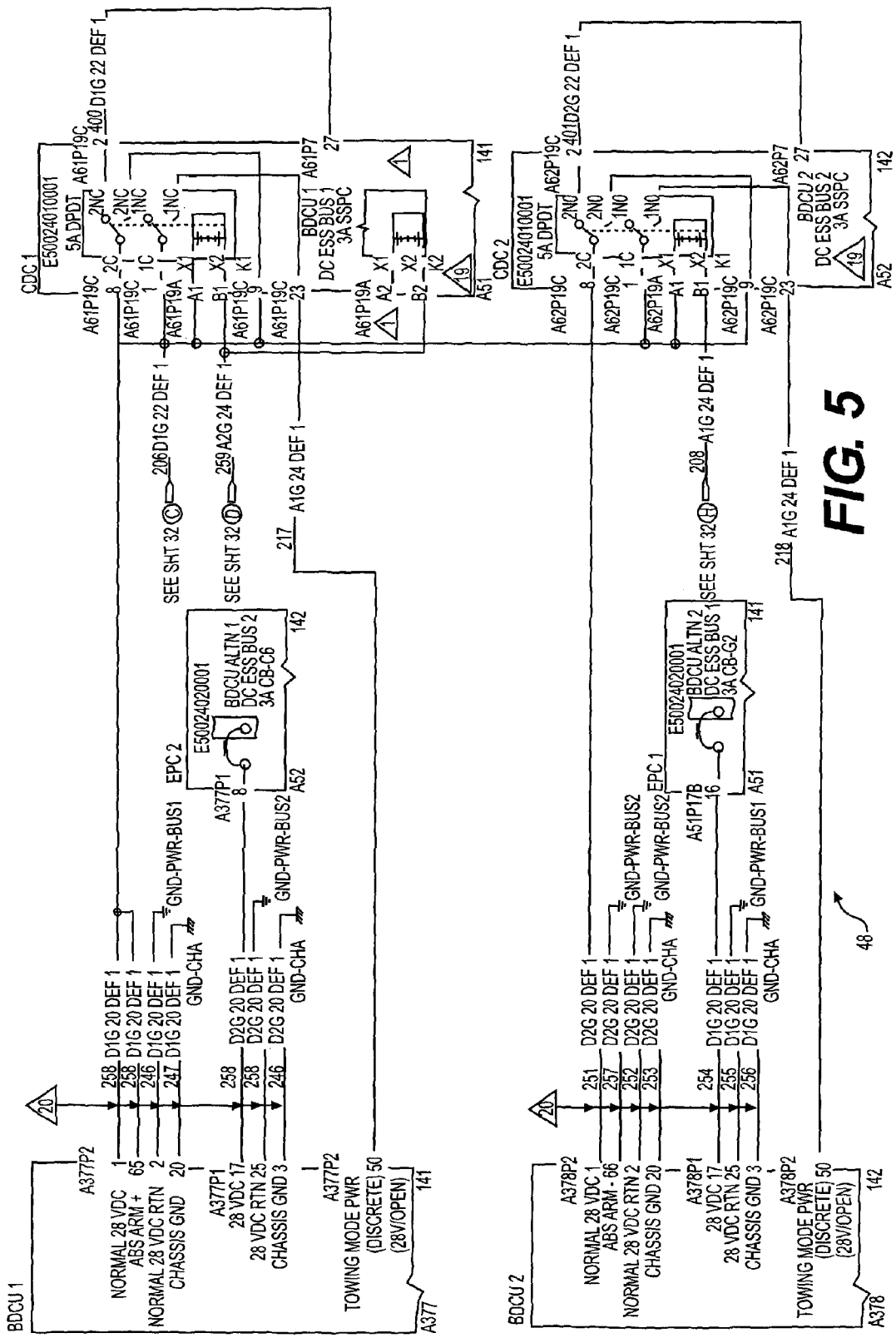
FIG. 5 is a third circuit diagram outlining additional aspects of the system of the present invention.

FIG. 5 is an electrical circuit diagram providing still further details concerning the parking brake system 48 of the present invention. For simplicity, the parking brake system is designated with the reference numeral 48 in the various figures depicting the present invention.

Figure 6:
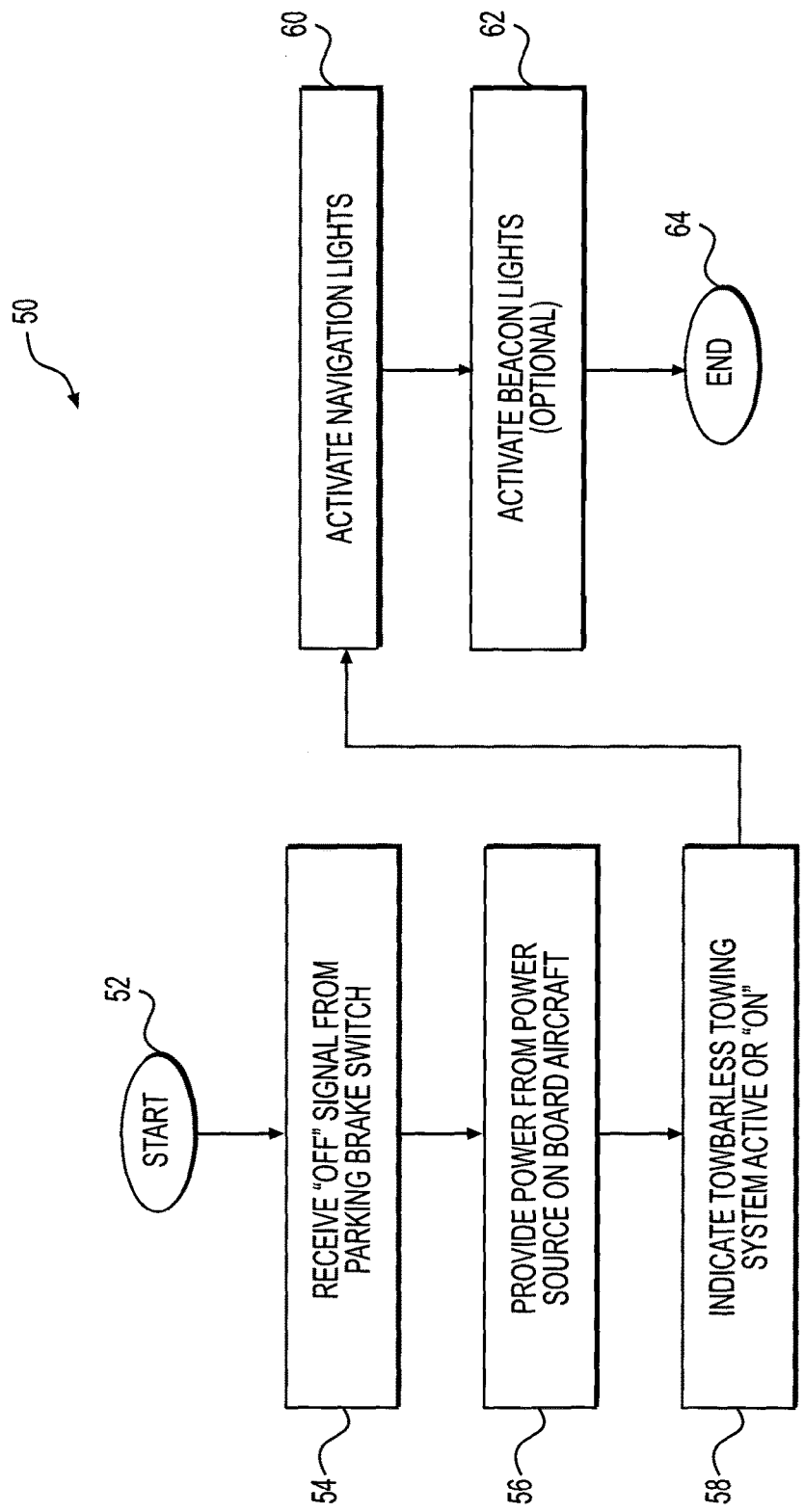
FIG. 6 is a flow chart illustrating one method contemplated for the parking brake system of the present invention.

FIG. 6 is a flow chart summarizing one method of operation of the parking brake system 48 of the present invention. The steps illustrate one possible series in which the steps may be performed. As will be made apparent from the discussion that follows, the steps may be performed in a different order without departing from the scope of the present invention.

The method 50 begins at step 52. In connection with the method 50, it is assumed that the parking brake for the aircraft 10 is "on," meaning that the aircraft 10 cannot be moved. If the parking brake is "off," the method 50 proceeds to step 56.

The method 50 proceeds to step 54, where the "off" signal is received from the parking brake switch 32.

With respect to the operation of the present invention, when the panel 28 is accessed, there are two potential states for the aircraft 10. The first state is "no tow," indicating that the parking brake is "on" or the steering is "on," which occurs when the aircraft 10 is powered up. As noted above, if the no tow light is illuminated, the parking brake is "on" and the aircraft 10 cannot be towed in that condition. The second state is "tow," indicating that the parking brake has been disengaged (or "off"). If the parking brake switch 32 is in the "off" position, the parking brake is disengaged and the aircraft 10 may be towed.

In another embodiment, it is contemplated that one or more operational aspects of the aircraft 10 may prohibit moving the aircraft 10. In such a case, the status of the brakes of the aircraft 10 may not be changed from "no tow" to "tow" by ground personnel. For example, the aircraft may be undergoing maintenance where moving the aircraft 10 from the current location is not desirable.

With respect to the present invention, it is contemplated that the status of the braking system (i.e., the parking brake) may be changed from "no tow" to "tow" simply by activating the parking brake switch 32. In other words, when the aircraft 10 indicates a "no tow" status, this simply means that the parking brake is engaged. By turning off the parking brake using the parking brake switch 32, the status of the aircraft 10 may be changed to "tow." As indicated above, the aircraft 10 may be placed into a condition ready for towing without personnel entering the aircraft 10. This is one aspect of the present invention.

After receipt of the signal disengaging the parking brake at step 54, the method 50 proceeds to step 56 where power is provided to the parking brake system 48 from the power source on board the aircraft 10. The parking brake may be disengaged at this step. As indicated above, towing power is provided by the batteries 46 on board the aircraft 10.

Once power is provided from the power source 46, the method 50 proceeds to step 58. At step 58, the tow power indicator 30 provides an indication that the parking brake system 48 is active. As should be apparent, other indicators may be provided to highlight that the parking brake system 48 is active.

After step 58, the method 50 proceeds to step 60 where the navigation lights on the aircraft 10 are activated.

The method 50 may then proceed to step 62, where the beacon lights are activated. As noted above, activation of the beacon lights is optional.

As should be apparent, the present invention incorporates logic on board the aircraft to execute the steps in the method 50. Typically, this is accomplished via switches and hardware. Of course, the present invention may be implemented via software or a combination of hardware and software without departing from the scope thereof.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A system for providing control to an electric parking brake for an aircraft having a battery during a towing operation of the aircraft, comprising:
   a panel of the aircraft accessible from an exterior of the aircraft;
   a power switch disposed on the panel, the power switch being configured to cause power from the battery to be provided to the electric parking brake;
   a parking brake switch disposed on the panel and configured to provide control over the engagement and disengagement of the electric parking brake on the aircraft using power from the battery; and
   a tow status indicator configured to provide an indication to the exterior of the aircraft as to whether or not the aircraft may be towed by a towing vehicle,
   wherein the electric parking brake is disabled if an active power system of the aircraft is turned on.

2. The system of claim 1, wherein the panel is proximate to a landing gear of the aircraft.

3. The system of claim 1, wherein the panel is proximate to a nose of the aircraft.

4. The system of claim 1, further comprising:
   a navigation lights switch, wherein the navigation lights switch permits activation and deactivation of navigation lights on the aircraft when power is provided to the electric brakes.

5. The system of claim 1, wherein navigation lights are activated when power is provided to the system from the battery.

6. The system of claim 4, wherein the navigation lights are powered by the battery.

7. The system of claim 6, wherein beacon lights are powered by the battery.

8. The system of claim 1, wherein:
   the tow status indicator is disposed on the panel;
   the tow status indicator is configured to indicate that towing is permitted when the parking brake is disengaged; and
   the tow status indicator is configured to indicate that towing is not permitted when the parking brake is engaged.

9. The system of claim 1, wherein the panel is accessible by a person standing on the ground, adjacent to the aircraft.

10. The method of claim 1, wherein receiving the signal from the parking brake switch to disengage the parking brake is performed without personnel being inside the aircraft.

11. The system of claim 1, wherein the tow status indicator is configured to indicate that towing is permitted when the parking brake is disengaged and a steering system of the aircraft is disabled.

12. The system of claim 1, wherein the tow status indicator is configured to indicate that towing is permitted when the parking brake is disengaged and the aircraft is powered down.

13. The system of claim 1, wherein the tow status indicator is located on the panel.

14. A method of operating a system for providing control to an electric parking brake for an aircraft having a battery, a panel accessible from an exterior of the aircraft, and a parking brake switch disposed on the panel to provide control over the engagement and disengagement of the electric parking brake on the aircraft, the method comprising:
   providing power from the battery to the electric parking brake where the electric parking brake is engaged;
   using a tow status indicator configured to provide an indication to the exterior of the aircraft to indicate that the aircraft may not be towed by a towing vehicle;
   receiving a signal from the parking brake switch disposed on the panel to disengage the electric parking brake;
   when the electric parking brake is disengaged, using the tow status indicator to indicate that the aircraft may be towed by a towing vehicle; and
   disabling the electric parking brake if an active power system of the aircraft is turned on.

15. The method of claim 14, wherein the panel is proximate to a landing gear of the aircraft.

16. The method of claim 14, wherein the panel is proximate to a nose of the aircraft.

17. The method of claim 14, wherein towing of the aircraft is controlled by at least one ground crew member.

18. The method of claim 14, wherein a power switch on the panel provides power to the system from the battery.

19. The method of claim 18, further comprising activating navigation lights on the aircraft after activation of a navigation lights switch on the panel.

20. The method of claim 14, wherein navigation lights are activated when power is provided to the system from the battery.

21. The method of claim 14, wherein the determining step includes assessing if the parking brake is engaged.

22. The method of claim 14, wherein the navigation lights are powered by the battery.

23. The method of claim 14, further comprising activating beacon lights on the aircraft.

24. The method of claim 23, wherein the beacon lights are powered by the battery.

25. The method of claim 14, wherein the panel is accessible by the ground crew member standing on the ground, adjacent to the aircraft.

26. The method of claim 14, comprising using the tow status indicator to indicate that towing is permitted when a steering system of the aircraft is disabled.

27. The method of claim 14, comprising using the tow status indicator to indicate that towing is permitted when the aircraft is powered down.

* * * * *